(12) United States Patent
Komori

(10) Patent No.: US 11,884,110 B2
(45) Date of Patent: Jan. 30, 2024

(54) TIRE

(71) Applicant: Sumitomo Rubber Industries, Ltd., Kobe (JP)

(72) Inventor: Yosuke Komori, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 272 days.

(21) Appl. No.: 17/093,670

(22) Filed: Nov. 10, 2020

(65) Prior Publication Data
US 2021/0146733 A1    May 20, 2021

(30) Foreign Application Priority Data

Nov. 18, 2019    (JP) ................. 2019-208060

(51) Int. Cl.
*B60C 13/00*    (2006.01)
*B60C 13/02*    (2006.01)

(52) U.S. Cl.
CPC ............ *B60C 13/02* (2013.01); *B60C 13/001* (2013.01)

(58) Field of Classification Search
CPC ............................. B60C 13/02; B60C 13/001
See application file for complete search history.

(56) References Cited

U.S. PATENT DOCUMENTS

2014/0326385 A1* 11/2014 Sato .................. B60C 13/001
                                                      152/523
2015/0321523 A1* 11/2015 Takahashi ............ B60C 13/02
                                                      152/523

FOREIGN PATENT DOCUMENTS

| EP | 2781376 A1 | 9/2014 |
| JP | 2004-17828 A | 1/2004 |
| JP | 2004-017828 A | 1/2004 |
| JP | 2014-136487 A | 7/2014 |
| WO | 2013/073128 A1 | 5/2013 |

OTHER PUBLICATIONS

Extended European search report dated Feb. 12, 2021, in corresponding European patent Application No. 20203096.1, 6 pages.

* cited by examiner

*Primary Examiner* — Justin R Fischer
*Assistant Examiner* — Brendon Charles Darby
(74) *Attorney, Agent, or Firm* — XSENSUS LLP

(57) ABSTRACT

A tire includes a surface geometry arrangement on a surface of a sidewall portion. The surface geometry arrangement includes a ridge pair in which two ridges bend so as to intersect each other a multiple number of times.

20 Claims, 9 Drawing Sheets

US 11,884,110 B2

TIRE

CROSS REFERENCE TO RELATED APPLICATION

The present application claims priority to Japanese patent application JP 2019-208060, filed on Nov. 18, 2019, the entire contents of which is incorporated herein by reference in its entirety.

BACKGROUND

Technical Field

The present disclosure relates to a tire having a surface geometry arrangement on a surface of a sidewall portion.

Description of the Background Art

A sidewall portion of a tire has a small thickness of rubber. Therefore, appearance defects such as recesses and projections called dents and bulges tend to be generated due to, for example, joints in a carcass that is an internal structural member.

To date, a serial member having ridges aligned on a surface of a sidewall portion has been provided in order to exhibit a camouflaging effect for making such bulges and dents inconspicuous.

For example, Japanese Laid-Open Patent Publication No. 2004-17828 discloses a member having an intersection pattern that includes first serrations and second serrations. The first serrations include a plurality of first ridges that is curved from the inner edge of the member to the outer edge thereof in the radial direction. The second serrations include a plurality of second ridges, and the plurality of second ridges has shapes different from the first ridges, extends outwardly in the radial direction, and intersects the first ridges.

However, the curved shapes of the first and the second ridges become complicated in order to allow the member as suggested above to exhibit a high camouflaging effect, so that processability in molds is degraded.

The present disclosure has been made in view of the aforementioned and other problems, and an aspect of the present disclosure is to provide a tire that can exhibit an excellent camouflaging effect while including ridges having simple shapes and inhibiting degradation of processability in molds.

SUMMARY

The present disclosure is directed to a tire including a surface geometry arrangement on a surface of a sidewall portion. The surface geometry arrangement includes a ridge pair in which two ridges intersect each other a multiple number of times while bending.

DESCRIPTION OF THE EMBODIMENTS

Embodiments of the present disclosure will be described below in detail. As conceptually shown in FIG. 1, a tire 1 of the present embodiment includes a surface geometry arrangement 3 on a surface 2S of a sidewall portion 2. The surface geometry arrangement 3 allows appearance defects such as bulges and dents to be made inconspicuous, and, for example, enhances visibility of a mark 4 including, for example, characters, symbols, and figures for indicating information such as a tire manufacturer name, a tire brand name, and a tire size.

Figure 2:
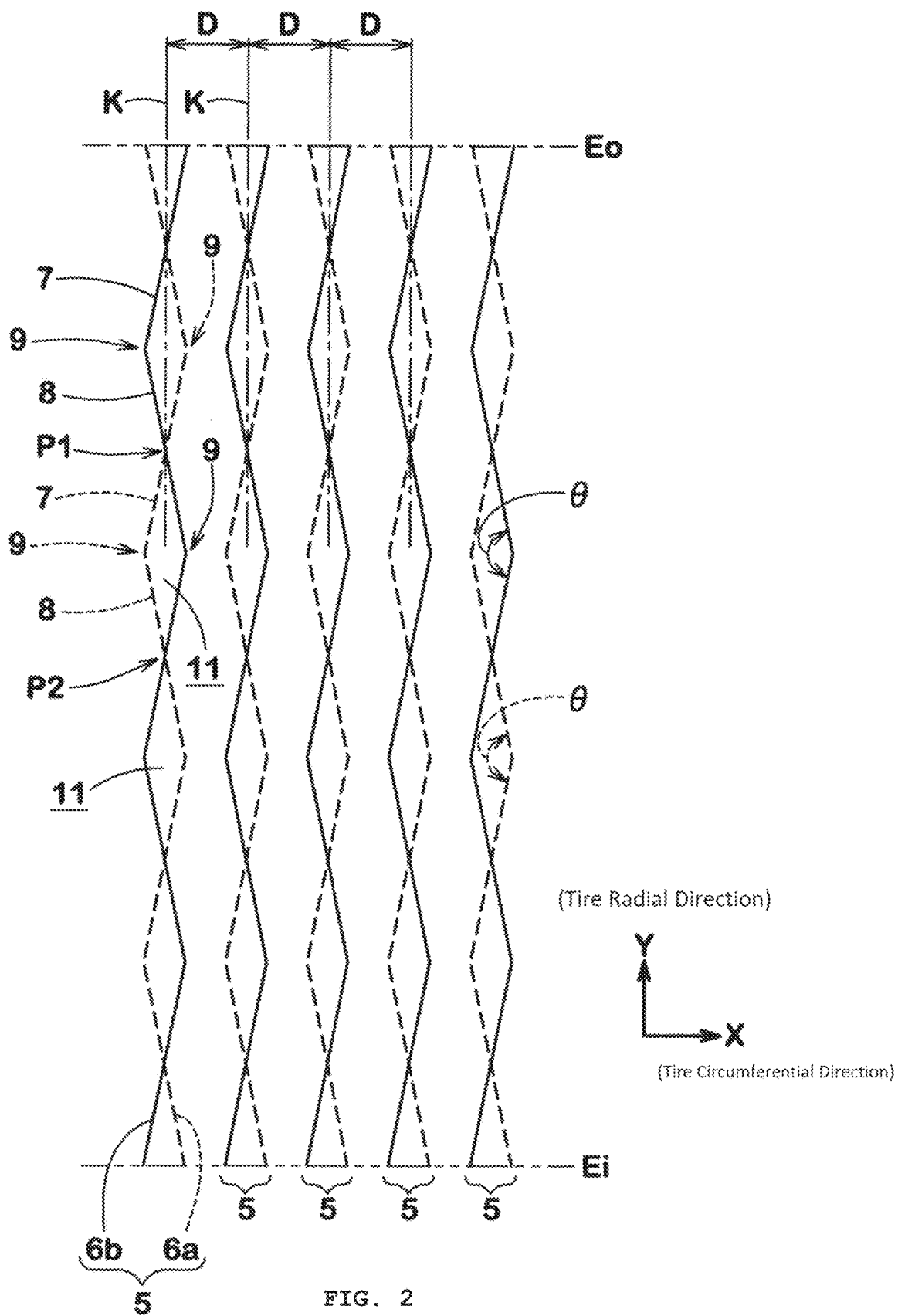
FIG. 2 is a conceptual diagram illustrating a part of a surface geometry arrangement in an enlarged manner.

The surface geometry arrangement 3 is a serially-formed member extending around a tire axis i in the tire circumferential direction (e.g., direction X in FIG. 2). In the present embodiment, the surface geometry arrangement 3 having an annular shape that continuously extends in the tire circumferential direction is shown. In the present embodiment, the mark 4, which may be characterized as an emblem, is formed in the surface geometry arrangement 3.

Figure 7:
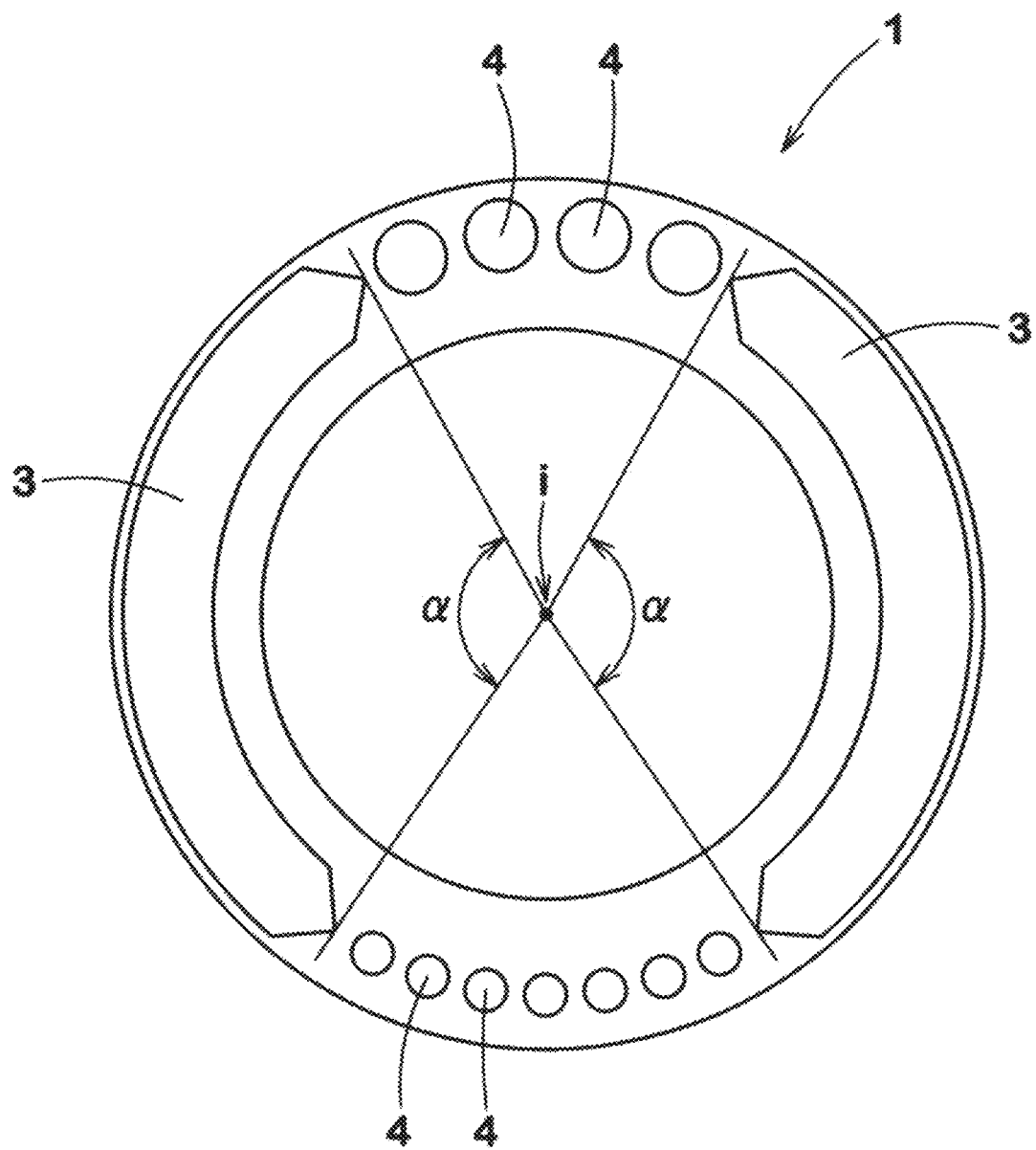
FIG. 7 is a front view of a surface geometry arrangement in a sidewall portion according to another example.

However, the surface geometry arrangement 3 is not limited thereto, and may be, for example, formed partially in the tire circumferential direction so as to be arc-shaped, as conceptually shown in FIG. 7. In a case where the surface geometry arrangement 3 is arc-shaped, a plurality of the surface geometry arrangements 3 is preferably disposed in the tire circumferential direction. In this case, the length of each surface geometry arrangement 3 in the tire circumferential direction is preferably not less than 90° in terms of a central angle α around the tire axis i. Furthermore, the mark 4 may be formed in a region between the surface geometry arrangements 3 and 3. In the surface geometry arrangement 3 in FIG. 7, ridges described below are not shown.

Figure 1:
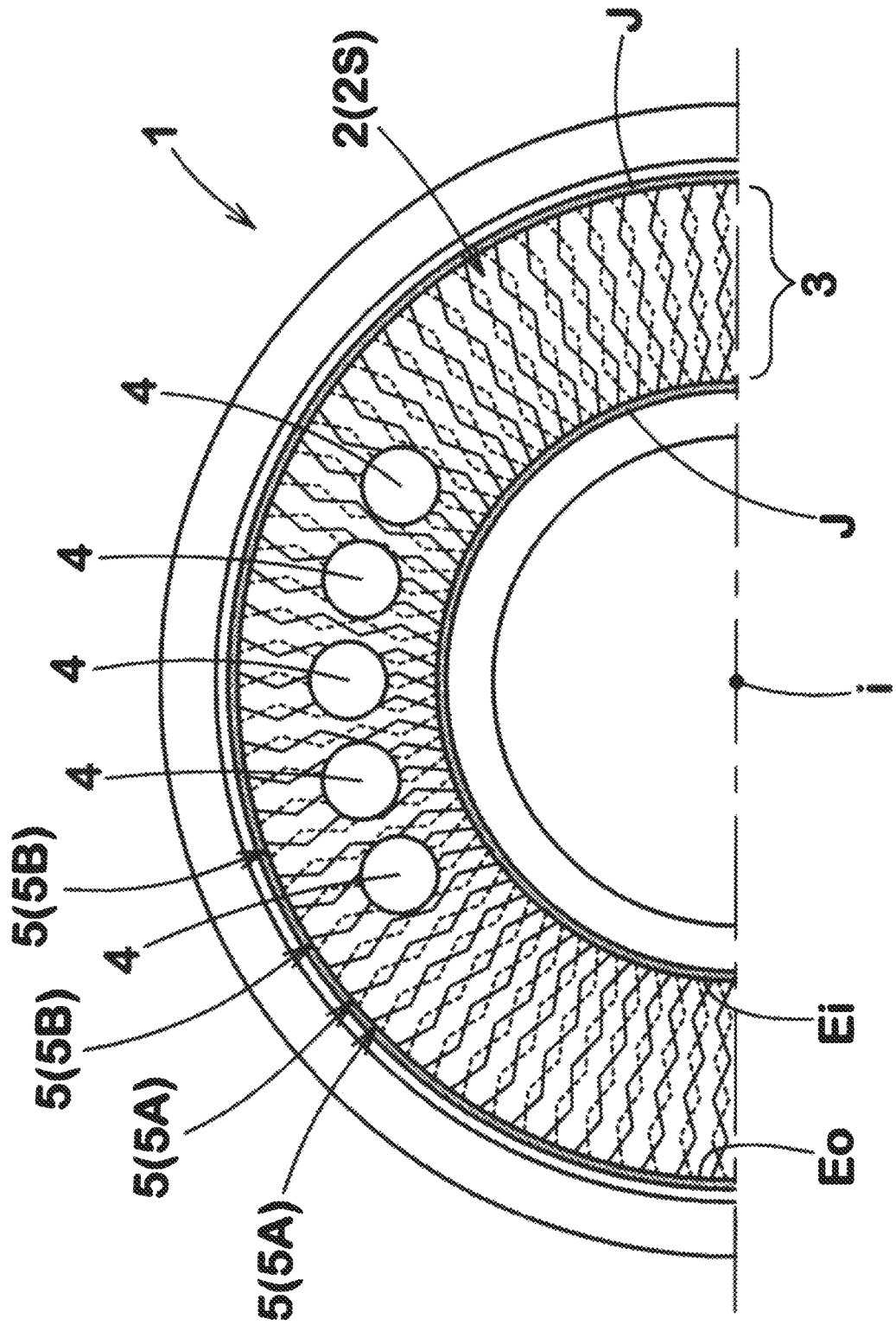
FIG. 1 is a partial front view of a sidewall portion of a tire according to one embodiment of the present disclosure.

As shown in FIG. 1, the surface geometry arrangement 3 includes one or more ridge pairs 5. In the present embodiment, a plurality of the ridge pairs 5 is disposed adjacent to each other in the tire circumferential direction.

Each ridge pair 5 extends from a tire radially inner edge Ei side of the surface geometry arrangement 3 to a tire radially outer edge Eo side of the surface geometry arrangement 3. The tire radial direction (e.g., direction Y in FIG. 2) is defined as a direction along the radial line extending from the tire axis i. The tire circumferential direction, as alluded to above, is defined as a direction along the circumferential line around the tire axis i.

In the present embodiment of FIG. 1, the ridge pair 5 extends along the tire radial direction. However, the ridge pair 5 may be inclined relative to the tire radial direction. In this case, an angle of the ridge pair 5 relative to the tire radial direction is preferably not greater than 45° and more preferably not greater than 30°.

The plurality of the ridge pairs 5 includes a ridge pair 5A extending continuously from the inner edge Ei side of the surface geometry arrangement 3 to the outer edge Eo side of the surface geometry arrangement 3, and a ridge pair 5B that is partially discontinuous due to, for example, the mark 4.

The surface geometry arrangement 3 preferably has a circumferential projection extending along the inner edge Ei side and/or the outer edge Eo side of the surface geometry arrangement 3 For example, the circumferential projection J is formed so as to have a shape that is reverse of a shape of an air vent groove formed in a tire vulcanization mold. Therefore, at least one of the ends of the ridge pair 5 connects with the circumferential projection J, whereby air between a mold surface and the sidewall portion 2 can be discharged through the ridge pair 5 and the circumferential projection J to the outside of the mold during vulcanization.

As shown in FIG. 2, each ridge pair 5 includes two ridges, that is, a pair of ridges 6a and 6b. The ridges 6a and 6b are bent and intersect each other a multiple number of times. In FIGS. 1, 2, 3A-3D, 6A-6D, 8A-8F, and 9A-9D, a width center C (shown in FIG. 4A and FIG. 4B) of each of the ridges 6a and 6b is representatively shown.

In FIG. 2, for convenience sake, the ridge pair 5 and the ridges 6a and 6b are represented in a rectangular coordinate system in which the tire circumferential direction is the X-axis direction and the tire radial direction is the Y-axis direction.

In embodiments, each of the ridges 6a and 6b has a zigzag bent shape formed by an inclined portion 7 inclined toward one side in the tire circumferential direction (for example, the right side in FIG. 2) outwardly in the tire radial direction, and an inclined portion 8 inclined toward the other side in the tire circumferential direction (for example, the left side in FIG. 2) outwardly in the tire radial direction, and a bent portion 9 between the inclined portions 7 and 8.

In the present embodiment of FIG. 2, the bent shape of the ridge 6a and the bent shape of the ridge 6b are the same, and the zigzag phases are shifted from each other by ½ pitch. Therefore, the inclined portion 7 of the ridge 6a and the inclined portion 8 of the ridge 6b intersect each other at an intersection point P1, and the inclined portion 8 of the ridge 6a and the inclined portion 7 of the ridge 6b intersect each other at an intersection point P2. The bent portion 9 of the ridge 6a and the bent portion 9 of the ridge 6b are disposed on both sides, in the tire circumferential direction, of a reference line K connecting between the intersection points P1 and P2, so as to oppose each other. The reference line K is referred to as the center line of the ridge pair 5, and the direction of the reference line K is referred to as a direction in which the ridge pair 5 extends.

Particularly, in the present embodiment of FIG. 2, the length of the inclined portion 7 and the length of the inclined portion 8 are equal to each other, and the intersection points P1 and P2 are located at the midpoint of the inclined portion 7 and the midpoint of the inclined portion 8.

The inclined portions 7 and 8 linearly extend and connect with each other at edges. Specifically, the ridges 6a and 6b are each bent to be L-shaped (this bent shape may be referred to as "zigzag").

Figure 3A:
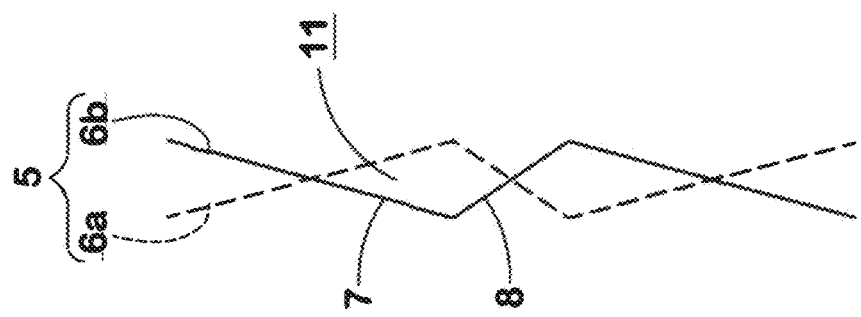
FIG. 3A is a conceptual diagram illustrating a ridge pair according to another embodiment.
Figure 3B:
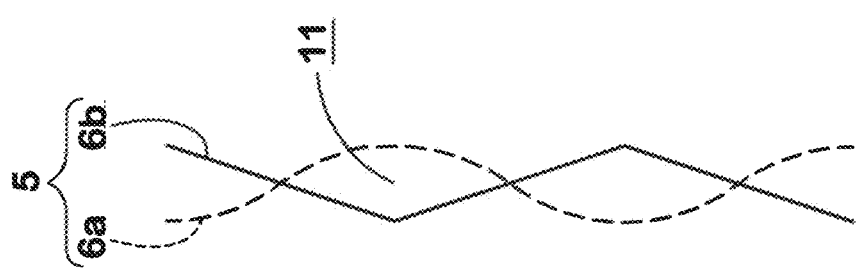
FIG. 3B is a conceptual diagram illustrating a ridge pair according to another embodiment.
Figure 3C:
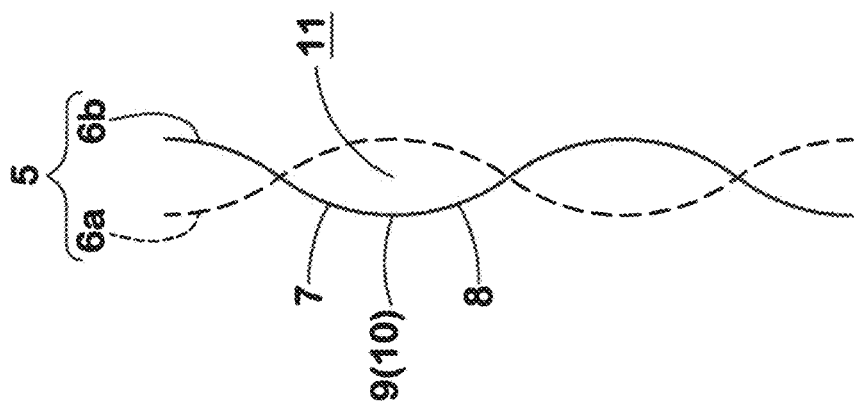
FIG. 3C is a conceptual diagram illustrating a ridge pair according to another embodiment.
Figure 3D:
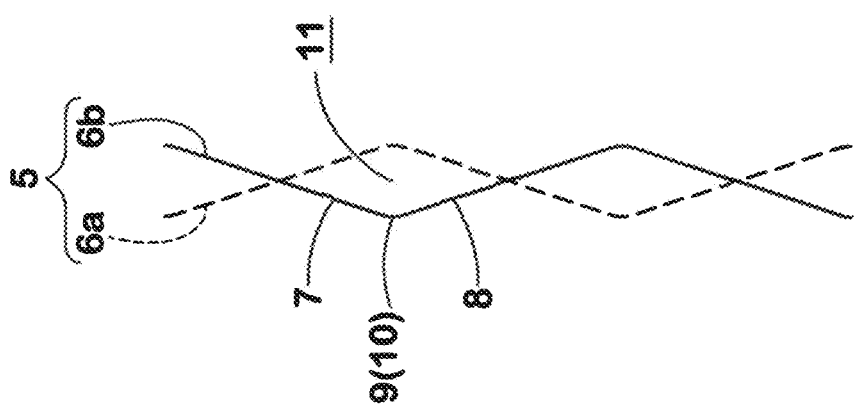
FIG. 3D is a conceptual diagram illustrating a ridge pair according to another embodiment.

However, the present disclosure is not limited thereto. In FIGS. 3A and 3B, the ridges 6a and 6b are curved. FIG. 3A illustrates a modification of the ridges shown in FIG. 2, and the inclined portions 7 and 8 that linearly extend smoothly connect with each other through an arc part 10 (the bent shape may be referred to as "substantially zigzag"). In FIG. 3B, for example, the ridges 6a and 6b are each formed into a wavy curve such as a sinusoidal-wave shape in which the inclined portion 7, the arc part 10, and the inclined portion 8 smoothly connect with each other. (This bent shape may be referred to as "wavy") As shown in FIG. 3C, one of the ridges (for example, 6a) may have a wavy shape, and the other of the ridges (for example, 6b) may zigzag. As shown in FIG. 3D, for example, the ridges 6a and 6b may be each formed into a zigzag bent shape such that the inclined portion 7 and the inclined portion 8 have different lengths.

In the surface geometry arrangement 3 that includes the ridge pair 5 having such a structure, the ridges 6a and 6b have simple bent shapes such as a zigzag shape and a wavy shape, so that degradation of processability in molds can be inhibited. Furthermore, the ridge pair 5 is formed such that the ridges 6a and 6b having bent shapes intersect each other a multiple number of times. Therefore, the ridge pattern can have variation and, for example, a plurality of small area portions 11 having rhombic shapes or the like is defined between the ridges 6a and 6b. Thus, bulges and dents are not easily recognized while the ridges 6a and 6b have simple bent shapes, thereby exhibiting an excellent camouflaging effect. In order to exhibit the camouflaging effect for bulges and dents, non-uniformity due to variation of the ridge pattern is effective.

As shown in FIG. 2, the ridges 6a and 6b intersect each other a multiple number of times. Therefore, air between the mold surface and the sidewall portion 2 can be guided to a vent groove through various paths during vulcanization. This can also contribute to reduction of appearance defects (so-called bare side) caused by air accumulation.

In a case where the number of times each of the ridges 6a and 6b is bent is too small in the ridge pair 5, variation of the ridge pattern is reduced and the ridge pattern becomes monotonous, thereby reducing the camouflaging effect. Furthermore, air is not discharged well and reduction of a bare side is disadvantageously inhibited. Meanwhile, in a case where the number of times each of the ridges 6a and 6b is bent is too great, the ridge pattern becomes too minute, and the camouflaging effect disadvantageously becomes poor. Furthermore, processability in molds is also degraded. From these viewpoints, the number of times the ridge pair 5A continuously extending between the inner edge Ei and the outer edge Eo is bent is preferably 4 to 6.

In the ridge pair 5, an angle θ between the inclined portions 7 and 8 is preferably not less than 30°.

In the ridge pairs 5 and 5 adjacent to each other in the tire circumferential direction, it is preferable that the ridges 6a and 6b forming one of the ridge pairs 5 and the ridges 6a and 6b forming the other of the ridge pairs 5 do not intersect each other. In a case where they intersect each other, the ridge pattern becomes too minute, and the camouflaging effect disadvantageously becomes poor.

In the present embodiment of FIG. 2, a distance D between the ridge pairs 5 and 5 adjacent to each other is uniform. The distance D is a circumferential distance between the reference lines K (center lines) of the ridge pairs 5 and 5 adjacent to each other, and is measured and compared at one circumferential line around the tire axis i. From the viewpoint that the ridge pattern is made non-uniform to enhance the camouflaging effect, the distance D between the ridge pairs 5 and 5 is preferably non-uniform, which is not shown. "The distance D is non-uniform" includes a meaning that at least one of the distances D indicates a value different from the other distances D. For example, the distances D can indicate a plurality (for example, 2 to 3) of different values are regularly or irregularly arranged in the tire circumferential direction.

Figure 4A:
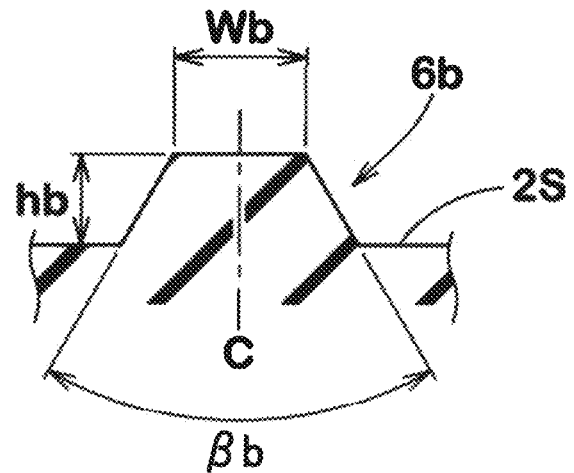
FIG. 4A is a cross-sectional view of a cross-sectional shape of a ridge.
Figure 4B:
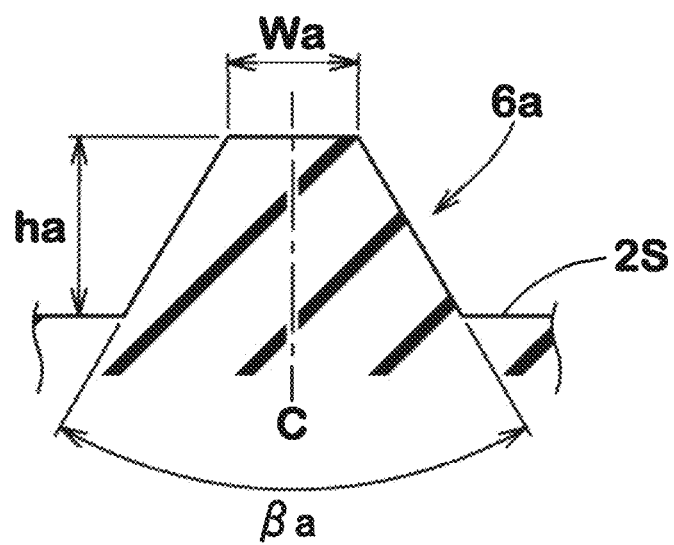
FIG. 4B is a cross-sectional view of a cross-sectional shape of a ridge.

FIGS. 4A and 4B show cross-sections perpendicular to the length direction of the ridge 6b and the ridge 6a. As shown in FIGS. 4A and 4B, the ridges 6a and 6b are projections projecting from the surface 2S of the sidewall portion 2 at small heights. Narrow grooves for the ridges are formed as recesses in the mold surface, and the ridges 6a and 6b having the shapes that are reverse of shapes of the recesses are formed in the tire 1.

In the ridge pair 5, a projecting height ha of one ridge 6a from the surface 2S is preferably greater than a projecting height hb of the other ridge 6b from the surface 2S. In a case where the projecting heights ha and hb are thus different from each other, the ridge pattern can have non-uniformity also in the depth direction, thereby enhancing the camouflaging effect. Preferably, the projecting heights ha and hb are each in a range of 0.1 to 0.5 mm. A ratio hb/ha of the projecting heights is preferably in a range of ¼ to ¾ from the viewpoint of processability in molds and the camouflaging effect.

Preferably, the ridges 6a and 6b have, for example, trapezoidal cross-sectional shapes in which vertex angles βa, βb are each in a range of 20 to 120°, and the vertex portions are truncated, from the viewpoint of processability in molds and the camouflaging effect. In this case, it is preferable that the widths Wa and Wb of short bases of the ridges 6a and 6b are each in a range of 0.1 to 0.4 mm, from the viewpoint of processability in molds and the camouflaging effect.

In the present embodiment of FIG. 4A and FIG. 4B, the vertex angle βa and the vertex angle βb are equal to each other. However, from the viewpoint that the ridge pattern can have non-uniformity, it is preferable that βa=βb is not satisfied. In the present embodiment of FIG. 4A and FIG. 4B, the width Wa and the width Wb are equal to each other. However, from the viewpoint that the ridge pattern can have non-uniformity, it is preferable that Wa=Wb is not satisfied.

Figure 5A:
FIG. 5A is a cross-sectional view of a cross-sectional shape of a ridge according to another embodiment.
Figure 5B:
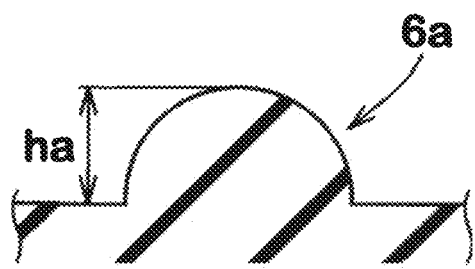
FIG. 5B is a cross-sectional view of a cross-sectional shape of a ridge according to another embodiment.

As shown in FIGS. 5A and 5B, the ridges 6a and 6b each having a semicircular cross-section can be also preferably used from the viewpoint of the processability in molds.

Figure 6D:
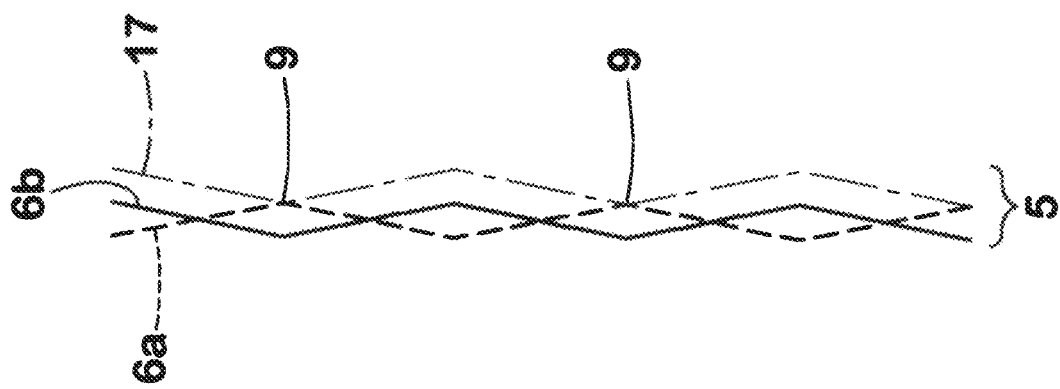
FIG. 6D is a conceptual diagram illustrating a ridge pair according to still another embodiment.
Figure 6C:
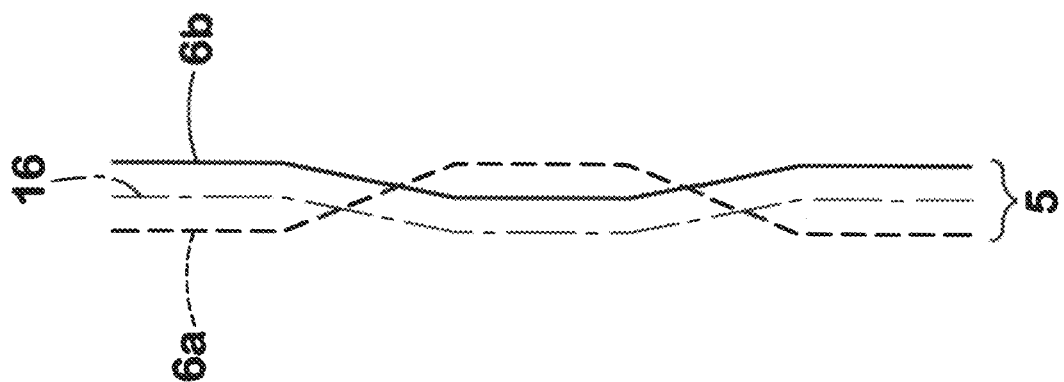
FIG. 6C is a conceptual diagram illustrating a ridge pair according to still another embodiment.
Figure 6B:
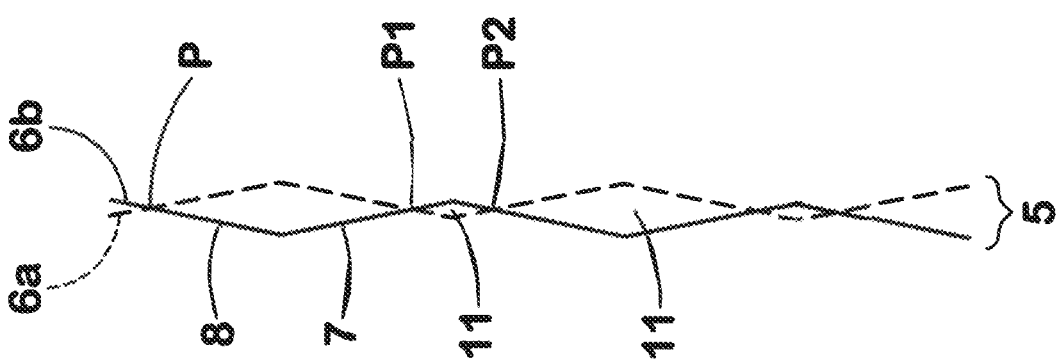
FIG. 6B is a conceptual diagram illustrating a ridge pair according to still another embodiment.
Figure 6A:
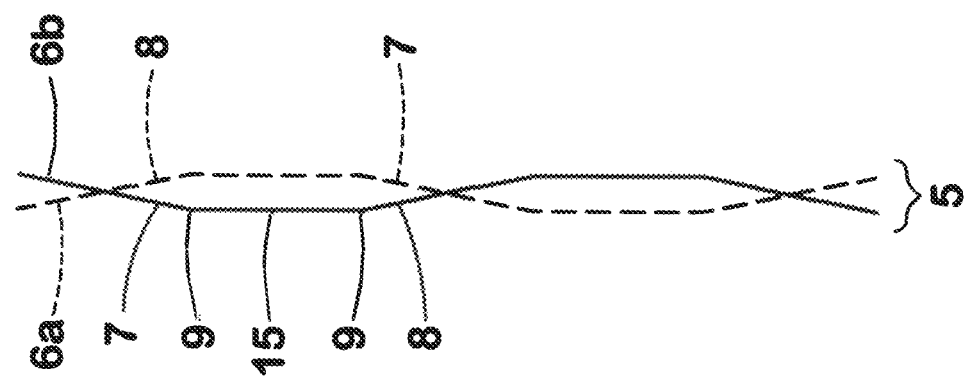
FIG. 6A is a conceptual diagram illustrating a ridge pair according to still another embodiment.

FIGS. 6A to 6D show other embodiments of the ridge pair 5. In FIG. 6A, the ridges 6a and 6b each include the inclined portion 7, a parallel portion 15 substantially parallel to the reference line K, and the inclined portion 8. The bent portion 9 is formed at each of a position at which the inclined portion 7 and the parallel portion 15 connect with each other, and a position at which the parallel portion 15 and the inclined portion 8 connect with each other. For example, the inclined portion 7 of the ridge 6a and the inclined portion 8 of the ridge 6b intersect each other at midpoints, and the inclined portion 8 of the ridge 6a and the inclined portion 7 of the ridge 6b intersect each other at midpoints.

FIG. 6B shows a modification of the ridges 6a and 6b shown in FIG. 2. As compared with the ridges 6a and 6b in FIG. 2, the ridge 6b is distant from the ridge 6a in the tire circumferential direction. Thus, the intersection points P1 and P2 are shifted from the midpoints of the inclined portion 7 and the inclined portion 8, and two small area portions 11 having a larger area and a smaller area alternate.

FIG. 6C shows a modification of the ridges 6a and 6b in FIG. 6A. A third ridge 16 having the same shape and phase as the ridge 6b is additionally disposed between the ridge 6a and the ridge 6b so as to be bent.

FIG. 6D shows a modification of the ridges 6a and 6b in FIG. 2. For example, a third ridge 17 having the same shape and phase as the ridge 6b is additionally disposed on one side (right side in the embodiment of FIG. 6D) of the ridges 6a and 6b in the tire circumferential direction so as to be bent. The third ridge 17 and the ridge 6a are in contact with each other at the bent portion 9.

A ridge that is not in contact with each ridge pair 5 can be separately disposed between the ridge pairs 5 and 5 adjacent to each other, which is not shown. The ridge which is not in contact with each ridge pair 5 may be bent similarly to the ridges 6a and 6b or may linearly extend.

Although the particularly preferred embodiments of the present disclosure have been described above in detail, the present disclosure is not limited to the embodiments shown in the drawings, and various modifications can be made to practice the present disclosure.

EXAMPLES

Samples of pneumatic tires (195/65R15) including surface geometry arrangements that had ridge patterns according to the specifications in Tables 1 and 2 on the surfaces of sidewall portions were produced. Each sample tire was tested for a camouflaging effect for bulges and dents, bare sides, processability in molds, and an outer appearance. In the comparative example and the examples, vertex angles βa and βb of ridges each having a trapezoidal cross-section was each 60°. The distances D between the ridge pairs were equal to each other in each of examples 1 to 7 and 9 to 11 and distances between the ridges were equal to each other in comparative example 1.

Camouflaging Effect for Bulges and Dents

Sensory evaluation was visually made for the degree of conspicuity of bulges and dents generated in the surface of the sidewall portion in a state where each sample tire was inflated to an internal pressure of 230 kPa. The results are each indicated as an index with the index of comparative example 1 being 100. The greater the value is, the more inconspicuous the bulges and dents are and the more excellent camouflaging effect is.

Bare Sides 1000 tires were vulcanized and molded. The incidence of the bare side is indicated as an index with the index of comparative example 1 being 100. The greater the value is, the more excellent air discharging properties are and the less the incidence of the base side is.

Processability in Molds

A processing time in a mold was measured when the ridge pattern was formed. The results are each indicated as an index with the index of comparative example 1 being 100. The greater the value is, the shorter the processing time is and the more excellent processability is.

Outer Appearance

An observer made sensory evaluation for the design properties. The results are each indicated as an index with the index of comparative example 1 being 100. The greater the value is, the better the outer appearance is.

In the tire of the present disclosure, a number of times each of the ridges of the ridge pair is bent can be 4 to 6.

In the tire of the present disclosure, a projecting height ha of one of the ridges of the ridge pair can be greater than a projecting height hb of the other of the ridges.

In the tire of the present disclosure, each of the ridges of the ridge pair can be curved.

In the tire of the present disclosure, the surface geometry arrangement can include a plurality of the ridge pairs. Preferably, the ridges of one of the ridge pairs adjacent to each other and the ridges of the other of the ridge pairs do not intersect each other.

In the tire of the present disclosure, the surface geometry arrangement can include a plurality of the ridge pairs. Distances between the ridge pairs adjacent to each other can be non-uniform.

According to the present disclosure, as described above, the surface geometry arrangement on the surface of the

TABLE 1

|  | Comp. Ex. 1 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Ridge pair | Absent | Present | | | | | | | |
| Ridge pattern | FIG. 9D | FIG. 8D | FIG. 8D | FIG. 8A | FIG. 8B | FIG. 8C | FIG. 8E | FIG. 8 F | FIG. 9A |
| The number of bending times of a ridge | | | | | 4 | | | | |
| The number of intersecting times in a pair of ridges | 0 | 5 | | 2 | 3 | | 5 | | |
| Cross-sectional shape of a ridge | Trapezoid | | Semicircle | | | Trapezoid | | | |
| Ridge width wa (mm) | 0.3 | | 9– | | | 0.3 | | | |
| Ridge width wb (mm) | — | 0.3 | — | | | 0.3 | | | |
| Ridge projecting height ha (mm) | | | | | 0.4 | | | | |
| Ridge projecting height hb (mm) | — | | | | | 0.2 | | | |
| Intersection between ridge pairs | | | Absent | | | | | Present | Absent |
| Distance D between ridge pairs | — | | | | Uniform | | | | Non-uniform |
| Camouflaging effect for bulges and dents | 100 | 200 | 200 | 165 | 185 | 200 | 180 | 150 | 210 |
| Bare sides | 100 | 100 | 100 | 100 | 100 | 100 | 100 | 100 | 98 |
| Processability in molds | 100 | 95 | 95 | 95 | 95 | 95 | 90 | 85 | 95 |
| Outer appearance | 100 | 100 | 100 | 100 | 100 | 100 | 100 | 100 | 95 |

TABLE 2

Figure 8A:
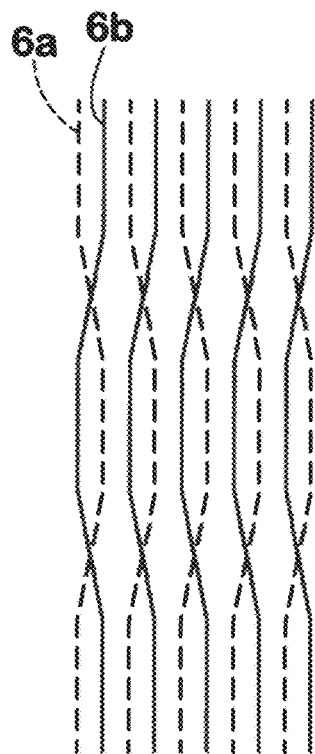
FIG. 8A is a conceptual diagram illustrating a ridge pattern in Tables 1 and 2.
Figure 8B:
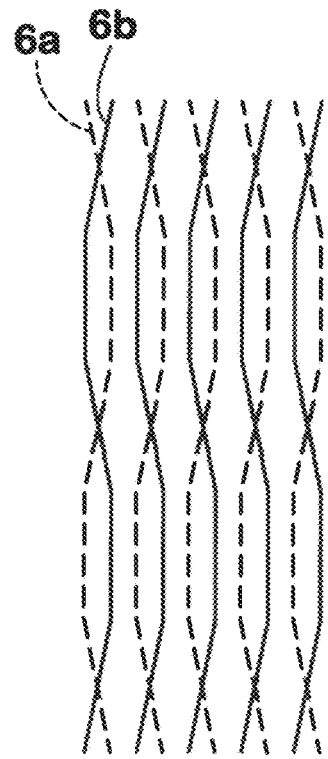
FIG. 8B is a conceptual diagram illustrating a ridge pattern in Tables 1 and 2.
Figure 8C:
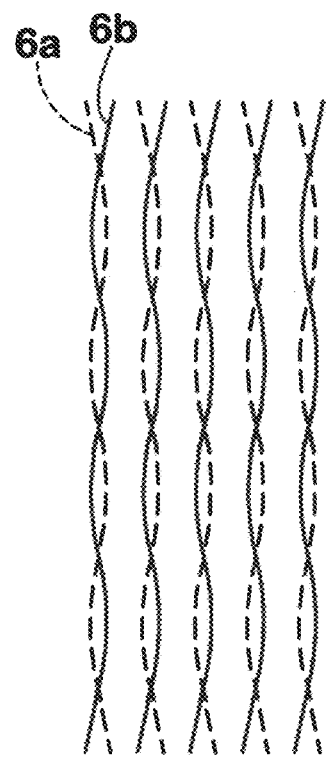
FIG. 8C is a conceptual diagram illustrating a ridge pattern in Tables 1 and 2.
Figure 8D:
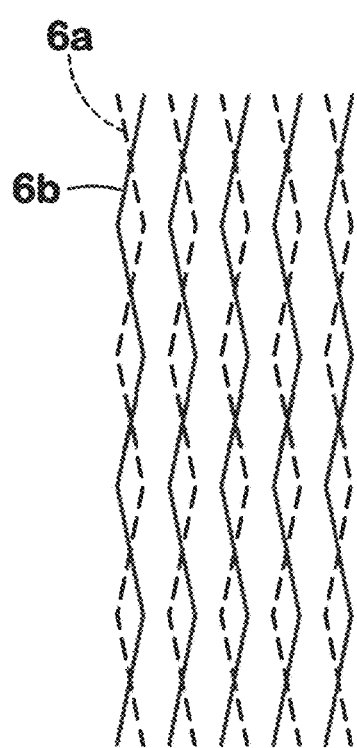
FIG. 8D is a conceptual diagram illustrating a ridge pattern in Tables 1 and 2.
Figure 8E:
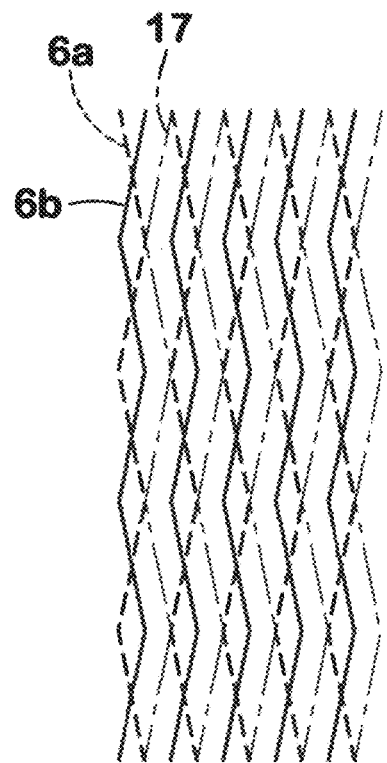
FIG. 8E is a conceptual diagram illustrating a ridge pattern in Tables 1 and 2.
Figure 8F:
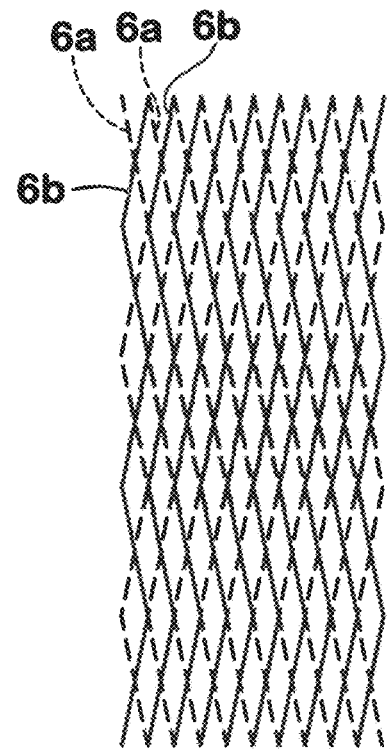
FIG. 8F is a conceptual diagram illustrating a ridge pattern in Tables 1 and 2.
Figure 9D:
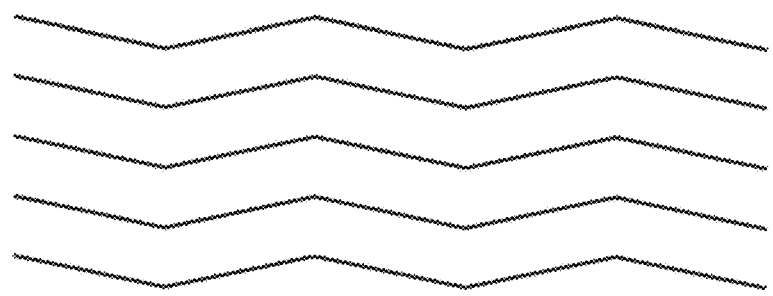
FIG. 9D is a conceptual diagram illustrating a ridge pattern in Tables 1 and 2.
Figure 9C:
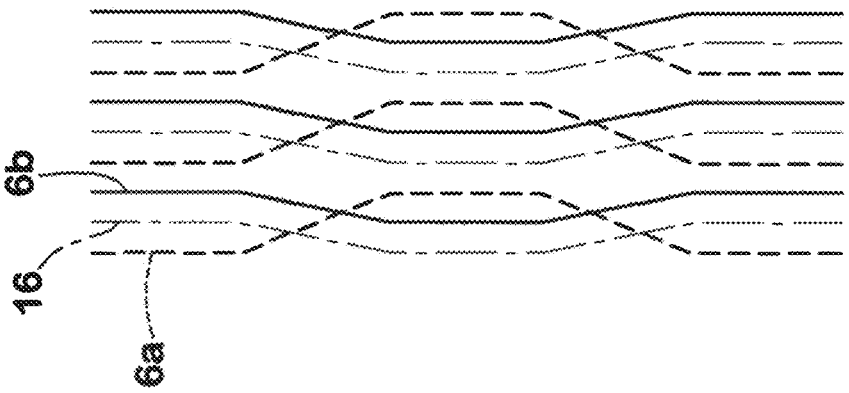
FIG. 9C is a conceptual diagram illustrating a ridge pattern in Tables 1 and 2.
Figure 9B:
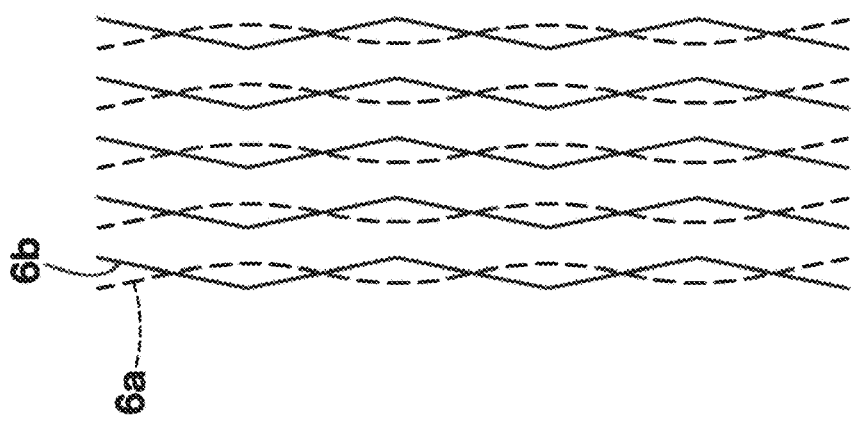
FIG. 9B is a conceptual diagram illustrating a ridge pattern in Tables 1 and 2.
Figure 9A:
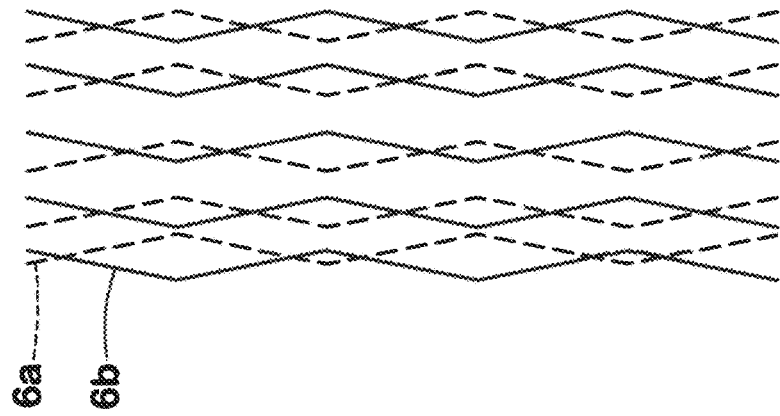
FIG. 9A is a conceptual diagram illustrating a ridge pattern in Tables 1 and 2.

|  | Ex. 9 | Ex. 10 | Ex. 11 |
| --- | --- | --- | --- |
| Ridge pair | | Present | |
| Ridge pattern | FIG. 9B | FIG. 9C | FIG. 8D |
| The number of bending times of a ridge | | 4 | |
| The number of intersecting times in a pair of ridges | 5 | 2 | 5 |
| Cross-sectional shape of a ridge | | Trapezoid | |
| Ridge width wa (mm) | | 0.3 | |
| Ridge width wb (mm) | | 0.3 | |
| Ridge projecting height ha (mm) | | 0.4 | |
| Ridge projecting height hb (mm) | | 0.2 | 0.4 |
| Intersection between ridge pairs | | Absent | |
| Distance D between ridge pairs | | Uniform | |
| Camouflaging effect for bulges and dents | 200 | 165 | 180 |
| Bare sides | 100 | 100 | 100 |
| Processability in molds | 95 | 95 | 95 |
| Outer appearance | 100 | 100 | 100 |

According to the tables, it was confirmed that the tires of the examples each exhibited an excellent camouflaging effect for bulges and dents while inhibiting degradation of processability in molds.

In the tire of the present disclosure, the ridge pair can extend from a tire radially inner edge side of the surface geometry arrangement to a tire radially outer edge side of the surface geometry arrangement.

sidewall portion includes the ridge pair in which two ridges intersect each other a multiple number of times while bending.

In the surface geometry arrangement that includes the ridge pair having such a structure, the ridges have simple bent shapes such as a zigzag shape, so that degradation of processability in molds can be inhibited. Furthermore, the ridge pair is formed such that the ridges having bent shapes intersect each other a multiple number of times. Therefore, the ridge pattern can have variation and a plurality of small area portions is defined between the ridges. Thus, bulges and dents are not easily recognized while the ridges have simple bent shapes, thereby exhibiting an excellent camouflaging effect.

What is claimed is:

1. A tire comprising a surface geometry arrangement on a surface of a sidewall portion, wherein the surface geometry arrangement includes a ridge pair in which two ridges bend so as to intersect each other a multiple number of times at corresponding multiple intersection points, wherein the pair of ridges intersect so as to form small area portions that are symmetrical about a reference line extending through the multiple intersection points, wherein the small area portions are free of any surface features, wherein the surface geometry arrangement comprises a plurality of the ridge pairs, and wherein, for adjacent ridge pairs of the plurality of ridge pairs, the ridges of one of the ridge pairs and the ridges of the other of the ridge pairs do not intersect each other.

2. The tire according to claim 1, wherein the ridge pair extends from a tire radially inner edge side of the surface geometry arrangement to a tire radially outer edge side of the surface geometry arrangement.

3. The tire according to claim 2., wherein a number of times each of the ridges of the ridge pair is bent is in an inclusive range of 4 through 6.

4. The tire according to claim 3, wherein a projecting height of one of the ridges of the ridge pair is greater than a projecting height of the other of the ridges of the ridge pair.

5. The tire according to claim 2, wherein a projecting height of one of the ridges of the ridge pair is greater than a projecting height of the other of the ridges of the ridge pair.

6. The tire according to claim 1, wherein a number of times each of the ridges of the ridge pair is bent is in an inclusive range of 4 through 6.

7. The tire according to claim 6, wherein a projecting height of one of the ridges of the ridge pair is greater than a projecting height of the other of the ridges of the ridge pair.

8. The tire according to claim 1, wherein a projecting height of one of the ridges of the ridge pair is greater than a projecting height of the other of the ridges of the ridge pair.

9. The tire according to claim 1, wherein each of the ridges of the ridge pair is zigzag shaped.

10. The tire according to claim 9,
wherein each of the ridges has To inclined potions, and
wherein the two inclined potions have different lengths.

11. The tire according to claim 1, wherein each of the ridges of the ridge pair is curved.

12. The tire according to claim 1, wherein each of the ridges of the ridge pair has a parallel potion substantially parallel to the reference line between two adjacent intersection points of the multiple intersection points.

13. The tire according to claim 1, wherein distances between adjacent ridge pairs are non-uniform.

14. The tire according to claim 1, wherein the ridge pair is comprised of two distinct ridge pair portions separated from each other by a mark on the surface of the sidewall portion.

15. The tire according to claim 1, wherein each of the two ridges of the ridge pair extend continuously from a tire radially inner edge side of the surface geometry arrangement to a. tire radially outer edge side of the surface geometry arrangement.

16. The tire according to claim 1, wherein the two ridges do not intersect each other at each of a first end and a second end opposite the first end of the ridge pair.

17. The tire according to claim 1, wherein the reference line extends through all of the multiple intersection points and is parallel to a tire radial direction at all times.

18. A tire comprising a surface geometry arrangement on a surface of a sidewall portion, wherein the surface geometry arrangement includes a ridge pair in which two ridges bend so as to intersect each other a multiple number of times at corresponding multiple intersection points, wherein the pair of ridges intersect so as to form small area portions, wherein the small area portions are free of any surface features, wherein the surface geometry arrangement comprises a plurality of the ridge pairs, and wherein, for adjacent ridge pairs of the plurality of ridge pairs, the ridges of one of the ridge pairs and the ridges of the other of the ridge pairs do not intersect each other.

19. A tire comprising a surface geometry arrangement on a surface of a sidewall portion, wherein the surface geometry arrangement includes a ridge pair in which two ridges bend so as to intersect each other a multiple number of times at corresponding multiple intersection points, wherein a reference line extends through all of the multiple intersection points and is parallel to a tire radial direction at all times, wherein the pair of ridges intersect so as to form small area portions, wherein the small area portions are free of any surface features, wherein the surface geometry arrangement comprises a plurality of the ridge pairs, and wherein, for adjacent ridge pairs of the plurality of ridge pairs, the ridges of one of the ridge pairs and the ridges of the other of the ridge pairs do not intersect each other.

20. The tire according to claim 19, wherein the small area portions have a length in the tire radial direction greater than a width in a tire circumferential direction.

\* \* \* \* \*